United States Patent
Hung et al.

(10) Patent No.: US 7,990,620 B2
(45) Date of Patent: Aug. 2, 2011

(54) HEAD-UP DISPLAY SYSTEM

(75) Inventors: Chang-li Hung, Taipei (TW); Ta-wei Lin, Taipei (TW); Feng-chun Yeh, Taipei (TW)

(73) Assignee: Opus Microsystems Corporation, Taipei (TW)

( * ) Notice: Subject to any disclaimer, the term of this patent is extended or adjusted under 35 U.S.C. 154(b) by 374 days.

(21) Appl. No.: 11/874,592

(22) Filed: Oct. 18, 2007

(65) Prior Publication Data
US 2009/0034087 A1    Feb. 5, 2009

(30) Foreign Application Priority Data
May 30, 2007  (TW) ............................... 96119402 A

(51) Int. Cl.
*G02B 27/14* (2006.01)
(52) U.S. Cl. ...................................................... 359/630
(58) Field of Classification Search .......... 359/630–634;
340/961, 980; 345/7
See application file for complete search history.

(56) References Cited

U.S. PATENT DOCUMENTS

| | | | |
|---|---|---|---|
| 5,760,931 A * | 6/1998 | Saburi et al. ................. | 359/13 |
| 5,808,801 A * | 9/1998 | Nakayama et al. .......... | 359/630 |
| 7,110,184 B1 * | 9/2006 | Yona et al. .................. | 359/630 |
| 7,203,005 B2 * | 4/2007 | Jiang et al. .................. | 359/630 |
| 2004/0008412 A1 | 1/2004 | Jiang et al. | |
| 2006/0023315 A1 | 2/2006 | Robinson | |

FOREIGN PATENT DOCUMENTS

| GB | 2269681 A | * 2/1994 |
|---|---|---|
| JP | 60124533 | 7/1985 |

* cited by examiner

*Primary Examiner* — Ricky Mack
*Assistant Examiner* — Vipin M. Patel

(57) ABSTRACT

A head-up display system is described. The head-up display system includes an image projection device, a diffusion unit, and a frame demonstration medium. The image projection device emits the visible light, containing text or image information, for generating a real image on the diffusion unit. The frame demonstration medium receives the visible light reflected from the diffusion unit. By adjusting the received visible light reflected from the diffusion unit, the frame demonstration medium generates a virtual image corresponding to the real image. The distance between the real image corresponding to the diffusion unit and the frame demonstration medium is preferably equal to the distance between the virtual image and the frame demonstration medium. Alternatively, the visible light is projected to the frame demonstration medium and then reflected to the diffusion unit. The frame demonstration medium again reflected visible light from the diffusion unit to generate a virtual image corresponding to the real image.

7 Claims, 4 Drawing Sheets

HEAD-UP DISPLAY SYSTEM

FIELD OF THE INVENTION

The present invention relates to a display system, and more particularly to a head-up display system.

BACKGROUND OF THE INVENTION

Head-up display (HUD) systems have been used in a variety of aircrafts, particularly associated with military applications for decades. Recently, more and more similar systems can be found in commercial automobiles. To be able to integrate the head-up display system into the console or the instrument panel of the automobiles, the bulky components of the system, such as the information display module, should be substituted with more compact units, e.g. a projection module, related to the head-up display system. Based on the above requirement, the projection module using laser light source is introduced into the head-up display system. The head-up display system receives the text or image information from the automobile and transfers it into the control signal of the laser light source. Then, the laser light source is projected onto a display medium in a scanning manner. The control signal manipulates the on/off sates of the laser, and thus the text or image information is re-generated in frames on this display medium. The driver in the automobile can see the information and make reactions accordingly.

Conventionally, the head-up display system employs a holographic element as a display medium. However, the holographic element has to be embedded into the windshield of the automobile. Manufacturing of such structure is quite complicated and thus increases the cost of the head-up display system. Moreover, the focal length of the virtual image located at one side of the holographic element is fixed. While the driver adjusts the seat height or angle, the distance from the driver's eyes to the windshield is changed. Once that distance is out of the focal length, the virtual image becomes blurred. The driver will be forced to move his (or her) head and body in order to get into focus. This may cause safety issues, especially when driving, and eventually nullify the head-up display system. Consequently, there is a need to develop a novel head-up display system to solve the above-mentioned problems.

SUMMARY OF THE INVENTION

One objective of the present invention is to provide a head-up display system to increase the depth of field of the image by using a frame demonstration medium for displaying the text or image information clearly.

Another objective of the present invention is to provide a head-up display system so that the driver is capable of adjusting the size of the image by controlling the image projection device.

Still another objective of the present invention is to provide a head-up display system for presenting the text or image information via the frame demonstration medium without obstructing the driver's view.

According to the above objectives, the head-up display system includes an image projection device, a diffusion unit, and a frame demonstration medium. In one embodiment, the image projection device emits a visible light. The diffusion unit, e.g. diffusion film, receives the visible light from the image projection device. A real image is generated on the diffusion unit. Further, the diffusion unit, having the function of gain adjustment within a predetermined view angle, is capable of controlling the brightness of the real image. The frame demonstration medium receives the visible light from the diffusion unit and generates a virtual image corresponding to the real image, where the distance between the real image on the diffusion unit and the frame demonstration medium is preferably equal to the distance between the virtual image and the frame demonstration medium. Further, the real image is generated on one side of the frame demonstration medium while the virtual image is generated on the other side of the frame demonstration medium. The head-up display system is suitable for variety of vehicles or aircrafts, and can be integrated into the global positioning system (GPS) or mobile phone.

In another embodiment, the image projection device is installed on a desired location, e.g. the instrument panel of the vehicle. A visible light is emitted from the image projection device to the frame demonstration medium, and reflected to the diffusion unit to generate a real image. The visible light is reflected back to the frame demonstration medium again. The frame demonstration medium then generates a virtual image corresponding to the real image.

According to the above-mentioned descriptions, the distance between the real image and the frame demonstration medium is preferably equal to the distance between the virtual image and the frame demonstration medium. This distance remains fixed once the system is set up and the distance is not affected by the variation of the distance between the driver's eyes to the windshield. Therefore the text or image information is always distinct no matter how the driver adjusts the seat. Further, the frame demonstration medium of the head-up display system is cost-effective in comparison with the holographic element.

The frame demonstration medium can be designed to selectively pass or block the laser light, and thus increase the clearness of the projected text or image information. For example, a band pass optical film can only pass the visible light within the selected range of wave length and displays the virtual image corresponding to this wave length range. A polarization film can filter the laser light having the same polarization direction, and displays the virtual image corresponding to the polarization direction. In other words, the frame demonstration medium 106 is a polarization film for adjusting the reflection ratio of the visible light. It should be noticed that the frame demonstration medium is substantially transparent to the visible light from outside of the windshield. The driver can clearly see the outer scenery through the frame demonstration medium and safely drives the vehicle.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1A:
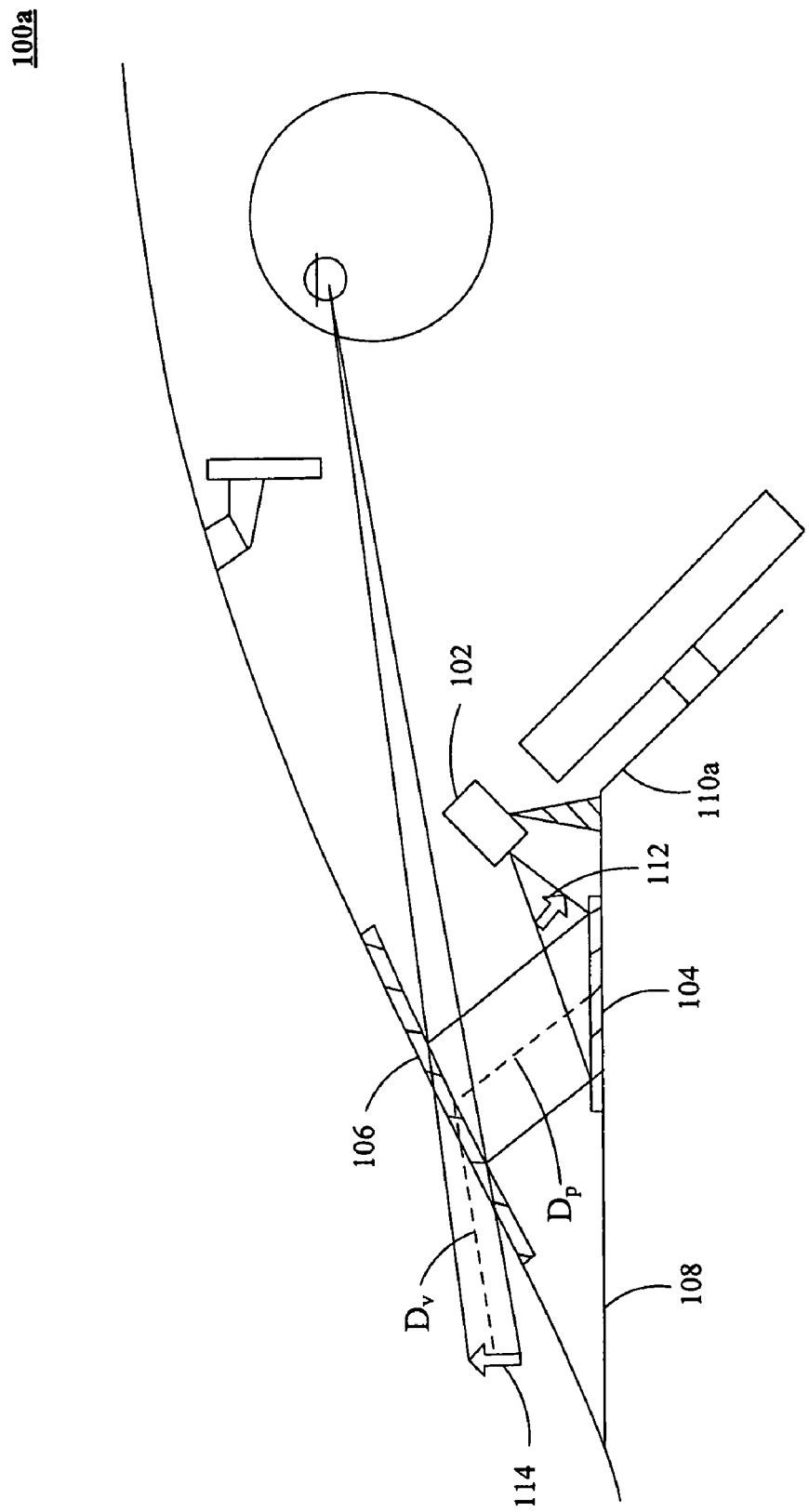
FIG. 1A is a schematic view of the head-up display system according to a first embodiment of the present invention.

FIG. 1A is a schematic view of the head-up display system 100a according to a first embodiment of the present invention.

The head-up display system 100a includes an image projection device 102, a diffusion unit 104, and a frame demonstration medium 106. The image projection device 102 is installed on the instrument panel 110a. The image projection device 102 emits the visible light, e.g. laser beams, to generate a real image 112 on the diffusion unit 104. The diffusion unit 104 receives the visible light emitted from the image projection device 102 to generate the real image 112. The diffusion unit 104 then reflects the received visible light. Further, the diffusion unit 104, such as a diffusion film with gain adjustment, is capable of adjusting the view angle of the visible light and controlling the brightness of the real image 112 on the diffusion unit 104. That is, the diffusion film diffuses the visible light and generates the real image 112 on the diffusion film. The frame demonstration medium 106 receives the visible laser light from the diffusion unit 104. By adjusting the received visible light from the diffusion unit 104, the frame demonstration medium 106 generates a virtual image 114 corresponding to the real image 112, where the distance "$D_p$" between the real image 112 on the diffusion unit 104 and the frame demonstration medium 106 is preferably equal to the distance "$D_v$" between the virtual image 114 and the frame demonstration medium 106. Further, the real image 112 is generated on one side of the frame demonstration medium 106 and the virtual image 114 is generated on the other side of the frame demonstration medium. The head-up display system 100a is suitable for the automobiles, vehicles or other aircrafts, and can be integrated into global positioning system (GPS) or mobile phone for the variety of vehicles.

In one embodiment, the visible light source in the image projection device 102 is a laser. Since the laser is a collimated and parallel light source, the head-up display system 100a can diminish or magnify the projected image size simply by varying the projection distance. The projected image will always be on focus no matter how the projection distance changes. Therefore, the head-up display system 100a in the present invention effectively omits the additional focus lens assembly and thus increases the cost-effectiveness. The wave length of the laser beam preferably has a range from 400 nm to 700 nm. It should be noted that the wave length may be lower or higher than the above-mentioned wave length range.

In one embodiment, the image projection device 102 in the head-up display system 100a utilizes a micro mirror to reflect the light, where the micro mirror oscillates back and forth around both the X-axis and the Y-axis. Alternatively, the image projection device 102 employs a set of micro mirrors, i.e. two micro mirrors, to be served as the reflection mirrors, wherein each micro mirror oscillates around one single axis, respectively, and the two axes are perpendicular to each other. The visible light is reflected from the first micro mirror to the second micro mirror and then is reflected again to the diffusion unit 104 to generate images. Thus, the set of micro mirrors also has the scanning directions of both the X-axis and the Y-axis. The micro mirrors are compact in comparison with other type of projection or display devices used in conventional head-up display system. Besides, there is no need of additional complicated lens assembly in the image projection device 102. Therefore the bulk of the present head-up display system 100a can be further shrunk.

In one embodiment, the frame demonstration medium 106, such as an optical film, having high reflectivity within a predetermined wave length range, filters the laser beam and generates the virtual image 114 corresponding to the real image 112. When the laser wave length coincides with the wave length range, the real image 112 is reflected by the frame demonstration medium 106 and the driver can see the virtual image 114. That is, if the laser wave length is located within the wave length range, the driver is able to see the virtual image 114. Preferably, the optical film is adhered to the windshield in front of the driver's sight line, or the optical film is a film which is sputtered or spread on the windshield. The driver can at the same time read the text or image information presented as the virtual image 114 and keep an eye on the traffic status in front.

Figure 1B:
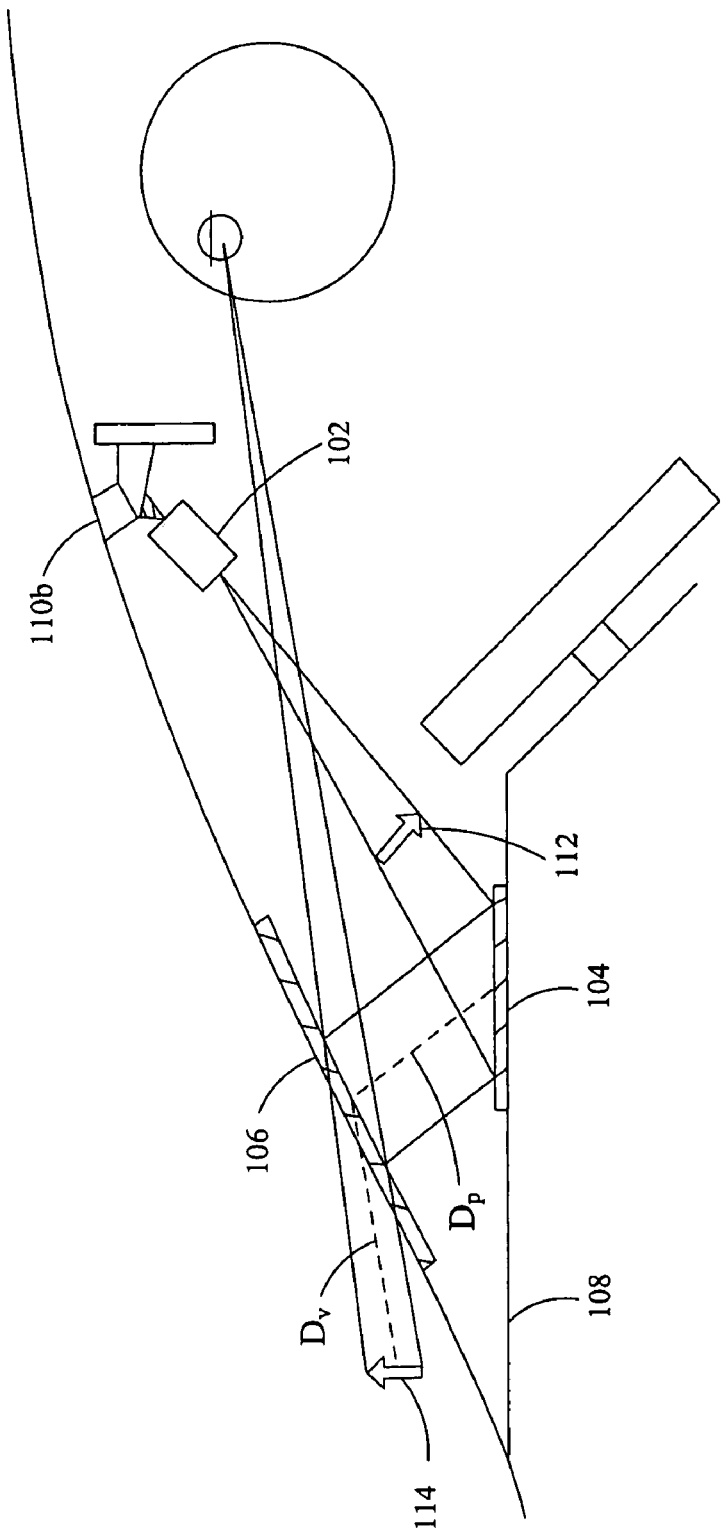
FIG. 1B is a schematic view of the head-up display system according to a second embodiment of the present invention.

FIG. 1B is a schematic view of the head-up display system 100b according to a second embodiment of the present invention. FIG. 1B is similar to FIG. 1A. The head-up display system 100b includes an image projection device 102, a diffusion unit 104, and a frame demonstration medium 106. The image projection device 102 is installed on the rear-view mirror 110b of the vehicle 108. The image projection device 102 emits the visible light to generate a real image 112 on the diffusion unit 104. The diffusion unit 104 receives the visible light emitted from the image projection device 102 to generate a real image 112. The diffusion unit 104 then reflects the received visible light. Further, the diffusion unit 104, such as a diffusion film with gain adjustment, is capable of adjusting the view angle of the visible light and controlling the brightness of the real image 112 on the diffusion unit 104. The frame demonstration medium 106 receives the visible laser light from the diffusion unit 104. By adjusting the received visible light from the diffusion unit 104, the frame demonstration medium 106 generates a virtual image 114 corresponding to the real image 112, where the distance "$D_p$" between the real image 112 on the diffusion unit 104 and the frame demonstration medium 106 is preferably equal to the distance "$D_v$" between the virtual image 114 and the frame demonstration medium 106. Further, the real image 112 is generated on one side of the frame demonstration medium 106 and the virtual image 114 is generated on the other side of the frame demonstration medium 106.

Figure 1C:
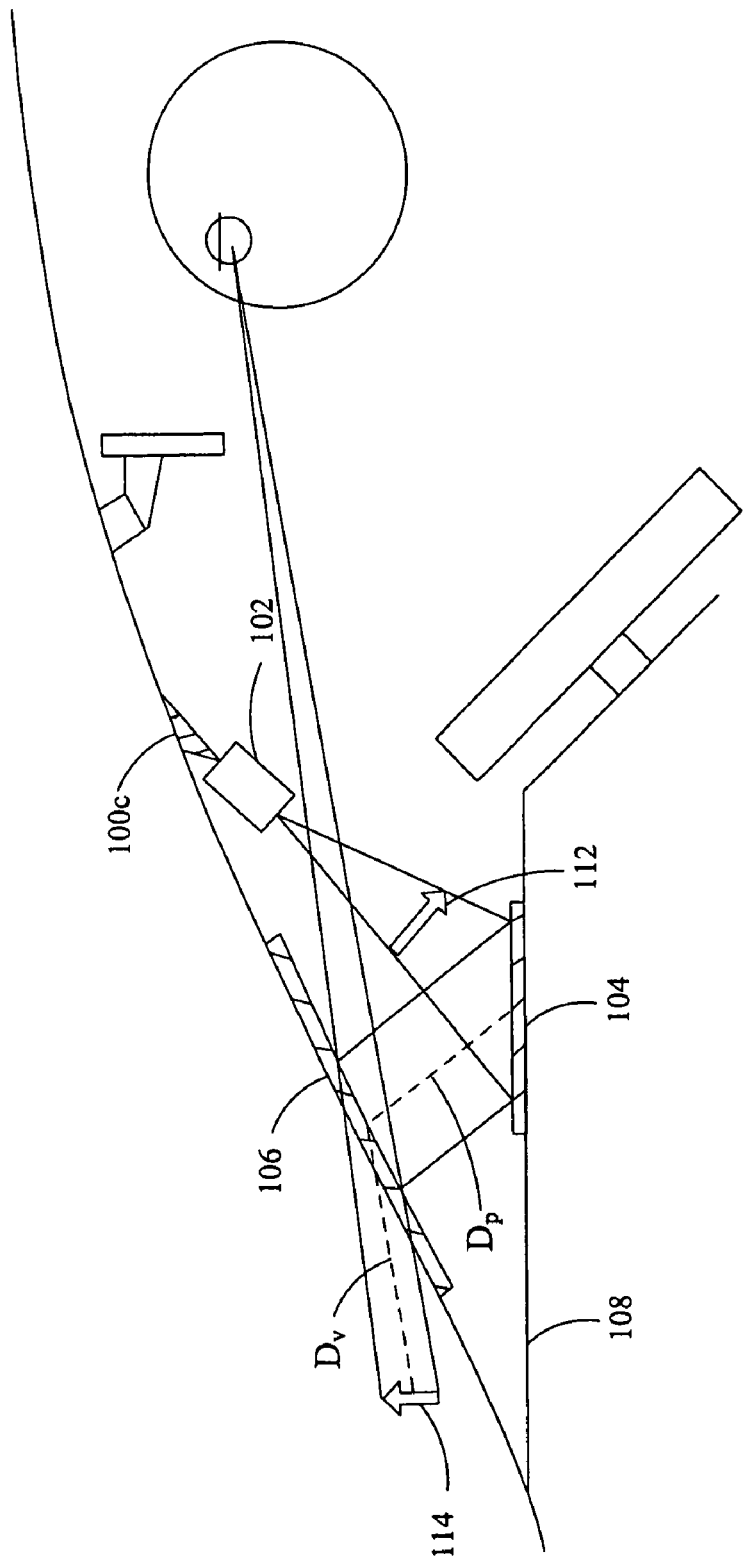
FIG. 1C is a schematic view of the head-up display system according to a third embodiment of the present invention.

FIG. 1C is a schematic view of the head-up display system 100c according to a third embodiment of the present invention. FIG. 1C is similar to FIG. 1A and FIG. 1B. The head-up display system 100c includes an image projection device 102, a diffusion unit 104, and a frame demonstration medium 106. The image projection device 102 is installed on the "A" pole 110c of the vehicle 108. The image projection device 102 emits the visible light to generate a real image 112 on the diffusion unit 104. The diffusion unit 104 receives the visible light emitted from the image projection device 102 to generate a real image 112. The diffusion unit 104 then reflects the received visible light. Further, the diffusion unit 104, such as a diffusion film with gain adjustment, is capable of adjusting the view angle of the visible light and controlling the brightness of the real image 112 on the diffusion unit 104. The frame demonstration medium 106 receives the visible laser light from the diffusion unit 104. By adjusting the received visible light from the diffusion unit 104, the frame demonstration medium 106 generates a virtual image 114 corresponding to the real image 112, where the distance "$D_p$" between the real image 112 on the diffusion unit 104 and the frame demonstration medium 106 is preferably equal to the distance "$D_v$" between the virtual image 114 and the frame demonstration medium 106. Further, the real image 112 is generated on one side of the frame demonstration medium 106 and the virtual image 114 is generated on the other side of the frame demonstration medium 106.

As shown in FIGS. 1A, 1B, and 1C, according to the above descriptions, the distance "$D_p$" between the real image 112 and the frame demonstration medium 106 is preferably equal to the distance "$D_v$" between the virtual image 114 and the frame demonstration medium 106. This distance is fixed once the present head-up display system is set. Even the distance from the driver's eyes to the windshield is changed after the driver adjusts the seat, the virtual image 114 remains distinct and clear all the time because the distance "$D_p$" is equal to the distance "$D_v$".

The frame demonstration medium 106 can be designed to selectively pass or block the laser light, and thus increase the clearness of the projected text or image information. For example, a band pass optical film can only pass the visible light within the selected range of wave length and displays the virtual image 114 corresponding to this wave length range. A polarization film can filter the laser light having the same polarization direction, and displays the virtual image 114 corresponding to the polarization direction. In other words, the frame demonstration medium 106 is a polarization film for adjusting the reflection ratio of the visible light. It should be noticed that the frame demonstration medium 106 is substantially transparent to the visible light from outside of the windshield. The driver can clearly see the outer scenery through the frame demonstration medium 106 and safely drives the vehicle.

Figure 2:
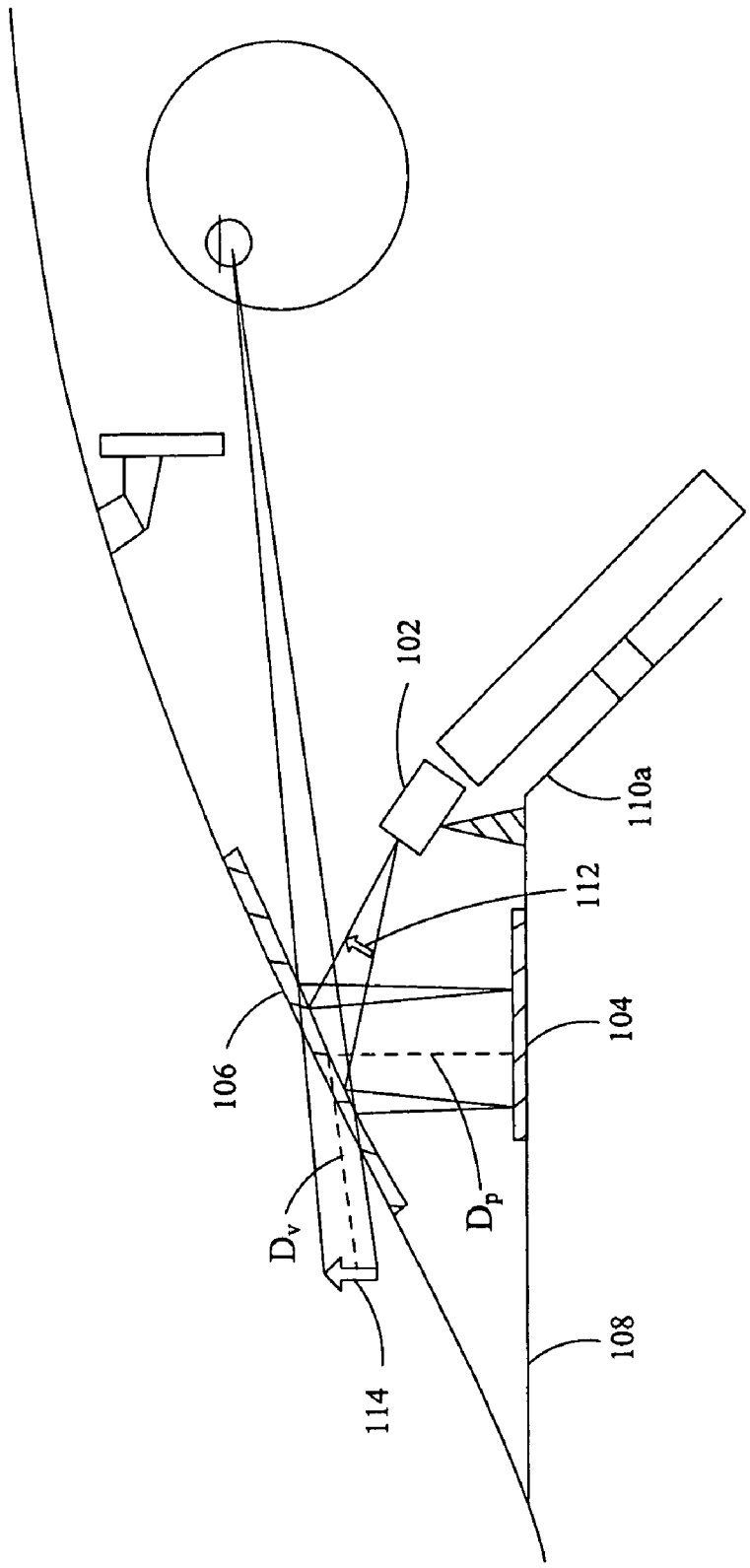
FIG. 2 is a schematic view of the head-up display system according to a fourth embodiment of the present invention.

FIG. 2 is a schematic view of the head-up display system 100d according to a fourth embodiment of the present invention. The head-up display system 100d includes an image projection device 102, a frame demonstration medium 106, and a diffusion unit 104. The image projection device 102 is installed on desired location, e.g. the top of the instrument panel or the console 110a. The image projection device 102 emits the visible light to generate a real image 112 on the diffusion unit 104. The diffusion unit 104 is preferably a diffusion film for diffusing the visible light and for generating the real image on the diffusion film 104. The frame demonstration medium 106 reflects the visible light from the image projection device 102 to the diffusion unit 104, and the real image 112 is generated on diffusion unit 104. The real image 112 is then reflected by the frame demonstration medium 106 and a virtual image 114 is generated corresponding to the real image 112. In one embodiment, the visible light from the image projection device 102 is a laser beam. The wave length of the laser beam preferably has a range from 400 nm to 700 nm. As shown in FIG. 2, the fourth embodiment considerably improves the installation flexibility of the head-up display system 100d. The image projection device 102 can be installed on the desired position where the visible light reaches. Further, user is able to adjust the distance or the projection angle between the image projection device 102 and the frame demonstration medium 106 to control the size and position of the virtual image 114 to be suitable for the driver.

In one embodiment, the frame demonstration medium 106, such as an optical film, has high reflectivity within predetermined wave length range, and the optical film selectively reflects the visible light, e.g. laser beams. When the laser wave length coincides with the wave length range, the real image 112 is reflected by the frame demonstration medium 106 and the driver can see the virtual image 114. That is, if the laser wave length is located within the wave length range, the driver is able to see the virtual image 114. Preferably, the optical film is adhered to the windshield in front of the driver's sight line, or the optical film is a film which is sputtered or spread on the windshield. The driver can at the same time read the text or image information presented as the virtual image 114 and keep an eye on the traffic status in front.

In another embodiment, the laser beam is polarized in a predetermined polarization direction, and the frame demonstration medium 106 is preferably a polarization film, which also has its own polarization direction. The ratio of the laser energy which passes the polarization film or is reflected by the polarization film can be adjusted or controlled by varying the angle between the polarized directions. For example, if the polarization directions of both the laser beam and the polarization film are parallel to each other, substantially all the laser energy passes through the polarization film. Once the two polarization directions are perpendicular to each other, almost all the laser energy is reflected back by the polarization film. Therefore the light intensity of the virtual image 114 can be controlled by varying the angle between the polarized directions. Preferably, the polarization film is adhered to the windshield in front of the driver's sight line, or the polarization film is sputtered or spread on the windshield. The driver can at the same time read the text or image information presented as the virtual image 114 via the polarization film and keep an eye on the traffic status in front.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A head-up display system, comprising:
   an image projection device, emitting visible light;
   a frame demonstration medium coupled to the image projection device, receiving the visible light emitted from the image projection device to reflect the received visible light; and
   a diffusion unit coupled to the frame demonstration medium, receiving the reflected visible light from the frame demonstration medium, a real image being formed on the diffusion unit based on the received visible light, the diffusion unit reflecting the real image back to the frame demonstration medium;
   wherein the real image is then reflected by the frame demonstration medium and a virtual image is formed corresponding to the real image; and
   wherein the frame demonstration medium is an optical film, having high reflectivity within a predetermined range of wave length.

2. The head-up display system of claim 1, wherein the diffusion unit is a diffusion film for diffusing the visible light and the real image is formed on the diffusion film.

3. The head-up display system of claim 1, wherein the visible light from the image projection device is a laser beam.

4. The head-up display system of claim 1, wherein the wave length has a range from 400 nm to 700 nm.

5. The head-up display system of claim 1, wherein the visible light has a predetermined polarization direction.

6. The head-up display system of claim 5, wherein the frame demonstration medium is a polarization film and is able to adjust the reflection ratio of the visible light.

7. The head-up display system of claim 1, wherein the real image is formed on one side of the frame demonstration medium and the virtual image is formed on the other side of the frame demonstration medium.

* * * * *